United States Patent

Baudu et al.

[11] Patent Number: 6,148,607
[45] Date of Patent: Nov. 21, 2000

[54] THRUST REVERSER WITH LOCK-STATUS DISPLAY

[75] Inventors: Pierre André Marcel Baudu, Le Havre; Patrick Gonidec, Montivilliers; Pascal Gérard Rouyer, Saint Aubin Routot; Guy Bernard Vauchel, Le Havre, all of France

[73] Assignee: Societe Hispano Suiza Aerostructures, France

[21] Appl. No.: 09/113,323

[22] Filed: Jul. 10, 1998

[30] Foreign Application Priority Data

Jul. 10, 1997 [FR] France ................................ 9708763

[51] Int. Cl.[7] ...................................................... F02K 1/60
[52] U.S. Cl. ........................ 60/226.2; 60/230; 244/110 B; 239/265.17
[58] Field of Search ...................... 60/226.2; 244/110 B; 239/265.27, 265.29, 265.31

[56] References Cited

U.S. PATENT DOCUMENTS

| 3,600,023 | 8/1971 | Gudde . | |
|---|---|---|---|
| 4,365,775 | 12/1982 | Glancy | 244/53 R |
| 4,498,823 | 2/1985 | Trautman | 410/84 |
| 4,613,099 | 9/1986 | Smith et al. . | |
| 4,754,694 | 7/1988 | Martin . | |
| 5,003,770 | 4/1991 | Schegerin et al. | 60/226.2 |
| 5,011,200 | 4/1991 | Glancy et al. | 292/113 |
| 5,120,004 | 6/1992 | Matthias | 60/226.2 |
| 5,243,817 | 9/1993 | Matthias | 60/226.2 |
| 5,448,884 | 9/1995 | Repp . | |
| 5,518,206 | 5/1996 | Arnold et al. | 244/129.4 |
| 5,524,431 | 6/1996 | Brusson et al. | 60/226.2 |

FOREIGN PATENT DOCUMENTS

| 0 243 286 | 10/1987 | European Pat. Off. . |
| 2 711 187 | 4/1995 | France . |

*Primary Examiner*—Ted Kim
*Attorney, Agent, or Firm*—Bacon & Thomas PLLC

[57] ABSTRACT

A thrust reverser for aircraft gas-turbine engines includes latch devices that display a tell-tale visible indication when thrust reverser shutters (doors, etc.) are ajar. A latch of the lock at least partly projects from a wall (13, 14) radially bounding the annular structure (12) of the thrust reverser (10) when the latch (37) is in the open mode.

2 Claims, 3 Drawing Sheets

THRUST REVERSER WITH LOCK-STATUS DISPLAY

BACKGROUND OF THE INVENTION

1. Field of the Invention

The invention relates to aircraft gas-turbine engine thrust-reversers and more particularly to thrust reversers especially designed to allow visual monitoring on the ground of the lock-status of the reverser shutter.

2. Related Technology

Aircraft thrust-reversers are well known equipment to reverse the thrust gas or air flows generated by gas-turbine engines powering the aircraft to decelerate the aircraft.

Thrust reversers typically are integrated with an an annular structure or cowling enclosing the gas-turbine engine. This annular structure in turn comprises a first portion or fixed structure which includes a plurality of radial apertures and a second portion consisting of at least one displaceable shutter device or door to close the radial apertures. When the radial apertures are closed, the thrust flow generated by the gas turbine engine is channeled rearwardly to propel the aircraft. When the radial apertures are open, the thrust flow passes through said apertures and is directed forwardly to decelerate the aircraft. High reliability is required for keeping the shutters in their closed position. Accordingly each shutter is kept closed by at least one main locking system and at least one emergency locking system, the purpose of the latter being to keep the shutter closed in spite of a failure in the main locking system. The expression "locking system" denotes a lock mounted on one part of the reverser assembly and cooperating with a lock-interfacing means mounted on another part of the reverser assembly. Usually, but not necessarily, the lock is mounted on the fixed structure and the lock-interfacing means is mounted on the shutter.

The typical annular thrust-reverser structure is radially bounded by two thin walls, namely an inner wall channeling the thrust flow and an outer wall exposed to the ambient air. These walls are interconnected by frame elements to achieve, with low weight, both thrust-reverser rigidity and structural integrity. Typically the locking systems are mounted on the bracing or frame elements for the fixed structure and the shutters.

Monitoring the appropriate locking of the shutters is based on electric detection and signaling means associated with the mechanical components controlling the locking procedure. The electric area signaling means themselves may malfunction or transmit spurious locking signals. Accordingly, a dangerous situation may arise which cannot be detected when the aircraft is on the ground and about to take off, namely when the shutters may be closed but unlocked. The problem is to reliably signal the closed mode of the locking means while the aircraft is on the ground.

SUMMARY OF THE INVENTION

The invention proposes a thrust-reverser fitted with a lock-status display and comprising in particular an annular reverser structure enveloping at least in part the gas turbine engine, said annular structure comprising radially inner and outer walls, said annular structure further comprising a first portion or fixed structure which has radial apertures therethrough and also at least a second portion or shutter(s) to close the radial apertures, the shutters are each kept locked onto the stationary structure by at least one locking device, including a lock rigidly affixed to part of the annular structure and comprising a latch pivoting on a hinge means, the latch cooperating with a lock-interfacing means rigidly joined to the other portion. Such a thrust reverser is unique because:

(a) at least one locking device is mounted on an outer wall radially bounding the annular reverser cowling structure, (b) the latch of the locking device projects at least partly away from said wall when it is in the open position.

The lock device design accordingly displays, that is, renders visible from the outside of the cowling structure, the position of the latch when in its open mode and provides ground-based visual and totally reliable monitoring of the proper locked status of the shutters.

An advantage of the present invention is its simplicity and economical implementation.

Moreover the present invention offers great latitude to the designer for selecting the appropriate latch design.

In a first embodiment of the invention, the latch end cooperating with the lock-interfacing means will protrude from the fixed cowling reverser structure when the latch is in the open mode.

In a second embodiment of the invention, the latch is fitted with an appendage projecting from the outer wall bounding the annular cowling reverser structure when the latch is in the open mode. This design allows cooperation between the latch end of the lock and a cooperating locking surface located more deeply inside the annular structure.

Advantageously the latch in its closed mode does not project beyond the wall. As a result of this design, observation of the latch in its closed mode will be masked, thereby enabling convenient visual monitoring in a "go/no-go" manner of the lock status. That is, the latch is visible when in its open mode and masked when in its closed mode.

Advantageously the latch may include a mask which can be fitted inside an aperture in the wall, the mask being aligned with the wall when the latch is in the closed mode. Such a design assures aerodynamic wall continuity when the latch is in the closed mode.

BRIEF DESCRIPTION OF THE DRAWINGS

The invention and its advantages are elucidated in the following description of illustrative embodiments, with reference to the attached drawings.

DETAILED DESCRIPTION OF THE PREFERRED EMBODIMENT

Figure 1:
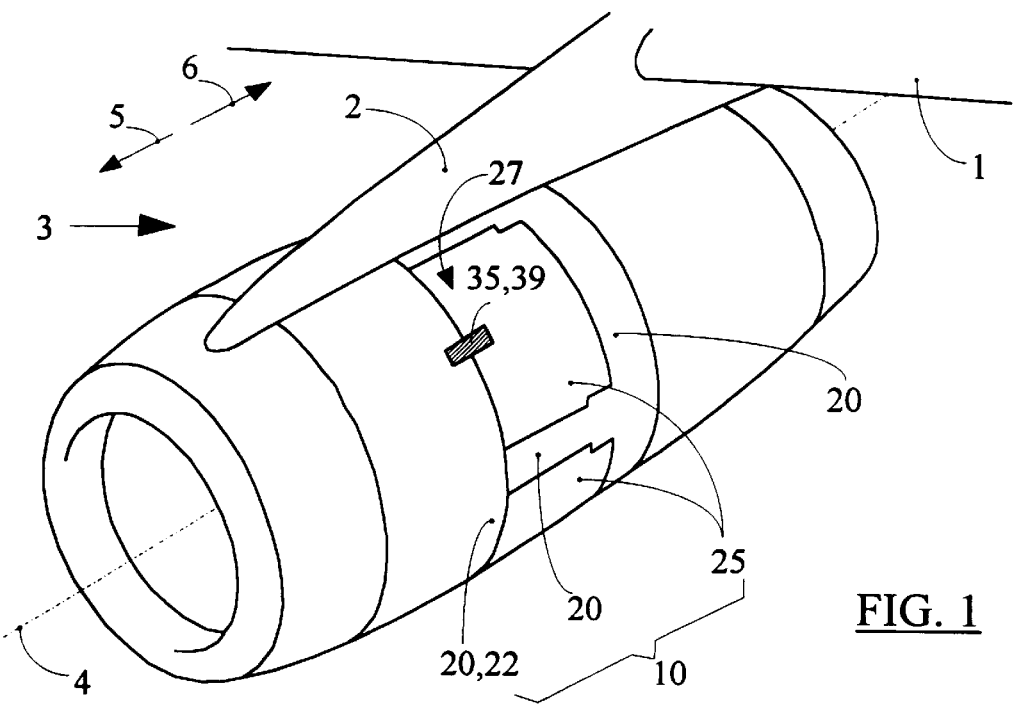
FIG. 1 shows an external view of a complete engine pod with a thrust reverser comprising pivoting shutters or doors.

With reference to FIG. 1, a pylon 2 under the wing 1 of an aircraft (not shown) holds a pod 3 enclosing a gas turbine engine extending along an engine axis 4. The pod 3 assumes a substantially annular shape around the axis 4. The reference 5 denotes the forward direction and the reference 6 the rearward or aft direction. The thrust reverser 10 constitutes a segment of the pod 3.

Figure 2:
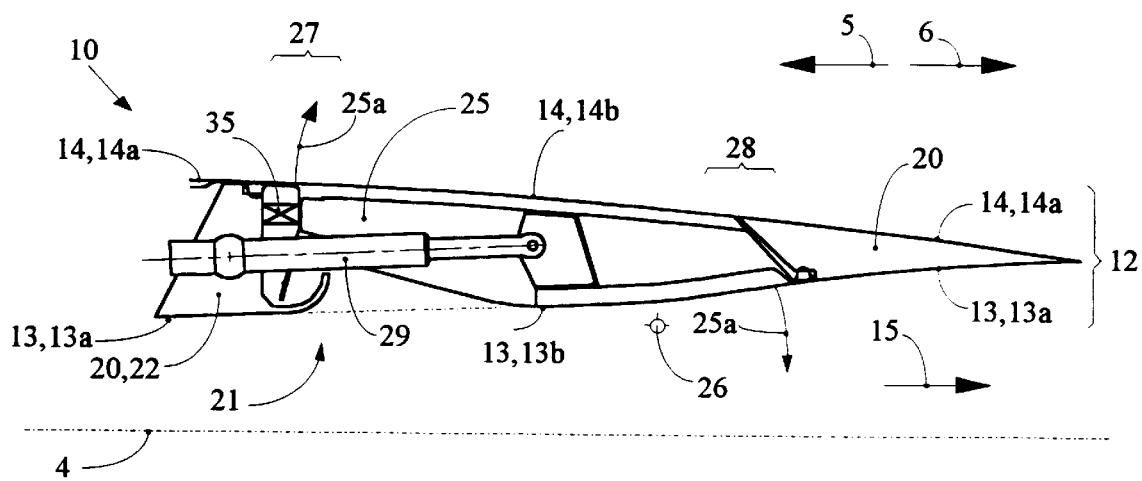
FIG. 2 is a partial longitudinal sectional view of the thrust reverser shown in FIG. 1.

As shown in FIG. 2, the thrust reverser 10 comprises an annular cowling structure 12 substantially in the shape of a body of revolution about the axis 4. The annular structure 12 is radially bounded by a thin inner wall or skin 13 and by a thin outer wall or skin 14. The inner wall 13 encloses and guides in an aft direction 6 the thrust gas flow 15 generated by the gas turbine engine.

The annular cowling structure 12 comprises a first front portion 20 called the fixed structure, which includes a plurality of radial apertures 21. An annular reinforcing structure 22 commonly called the fore frame is mounted at the front 5 of the radial apertures 21. Furthermore the annular structure 12 comprises at least a second portion 25 comprising displaceable shutters that close the radial apertures 21.

In this embodiment, the shutters 25 are pivotable and are called doors. Typically such shutters 25 are mounted on pivots 26, their pivoting motion merely being a rotation about these pivots 26. These shutters 25 also may be mounted on a set of linkage rods (not shown), the pivoting motion then being more complex but not affecting the present invention. The front and rear parts of the shutter 25 are respectively denoted by 27 and 28.

The shutter is driven into open and closed positions by control means 29 which in this instance includes a hydraulic linear actuator hinged at one end to the fixed structure 20 and at its other end to the shutter 25. The portions of the walls 13 and 14 are part of the fixed structure 20 and are referenced by 13*a* and 14*a*, respectively. The portions of the walls 13 and 14 belonging to the shutter 25 are denoted by 13*b* and 14*b*.

When the shutter 25 is in the closed mode, the wall portions 13*b* and 14*b* are aligned with the wall portions 13*a*, 14*a* at the fixed cowling structure 20. The annular structure 12 of the thrust reverser 10 also comprises locking systems 35 to keep the shutter 25 in its closed mode without resorting to the control means 29. These locking systems 35 typically are mounted between the front part 27 of the shutter 25 and the fixed structure 20.

Figure 3:
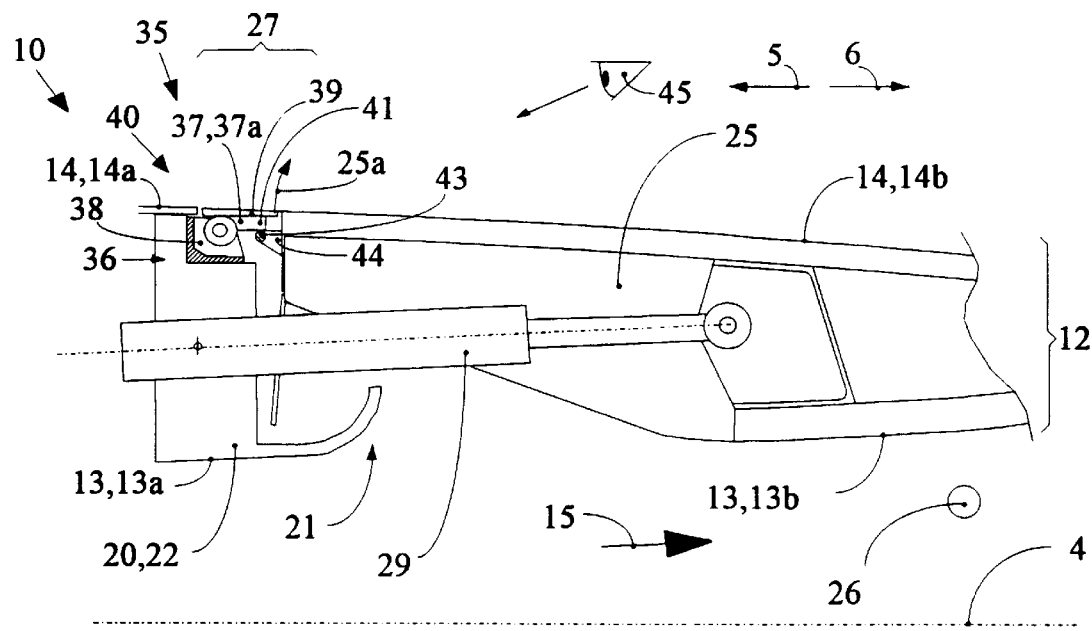
FIG. 3 schematically shows the configuration of an emergency locking system in its closed position forward of a pivoting shutter of the reverser.

In FIG. 3, the shutter 25 is in its closed position. The path of the shutter 25 when opening is denoted by 25*a*. The locking system 35 is mounted on the outer wall 14 and comprises a lock 36 fitted with a latch 37 hinging on the case 38 of the lock 36 and comprising a mask 39 which may be fitted inside an aperture 40 in the outer wall 14. The lock 36 also comprises means driving the latch 37, said driving means being omitted because it is not part of the invention. The emergency locking system 35 furthermore comprises a lock-interfacing or cooperating device 43 which in this instance consists of a roller 43 held by a bracket 44 at the front end 27 of the shutter 25. The end of the latch 37 cooperating with the lock-interfacing means 43 is denoted by 41.

When the latch 37 is in its closed position 37*a* as shown in FIG. 3, the mask 39 is located in the aperture 40 of the outer wall 14 and aligned with this wall 14 in order to assure its aerodynamic continuity.

In this manner the closed mode and the actual locking of the shutter 25 are visible to an external observer 45 by means of the alignment of the portions 14*a* and 14*b* of the wall 14 to each other and to the mask 39.

Figure 4:
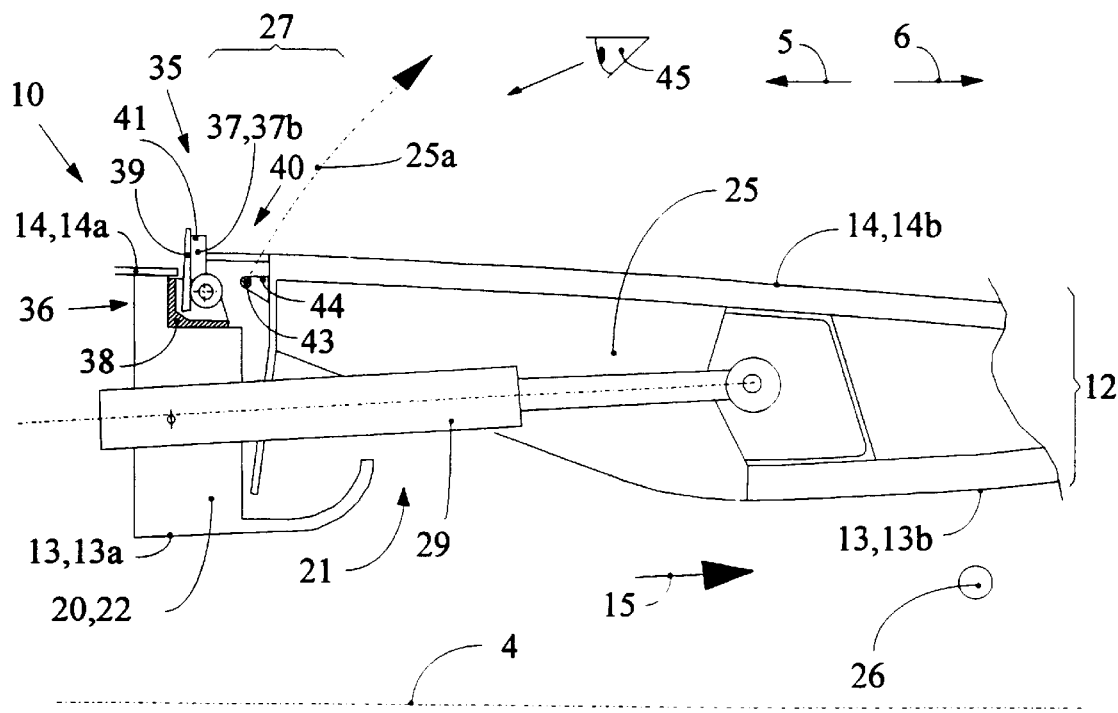
FIG. 4 shows the configuration of the same locking system in its open position, the shutter being ajar.

In FIG. 4 the shutter 25 is ajar whereas the latch 37 is in the open position 37*b* and partly emerging by its end 41 from the outer wall 14. It will be appreciated that when in this position 37*b*, the latch 37 is kept visible from the outside to indicate the shutter 25 is unlocked.

As noted previously, FIG. 1 shows the configuration of the locking systems 35 with the mask 39 located at the forward end 27 of the shutters 25.

Figure 5:
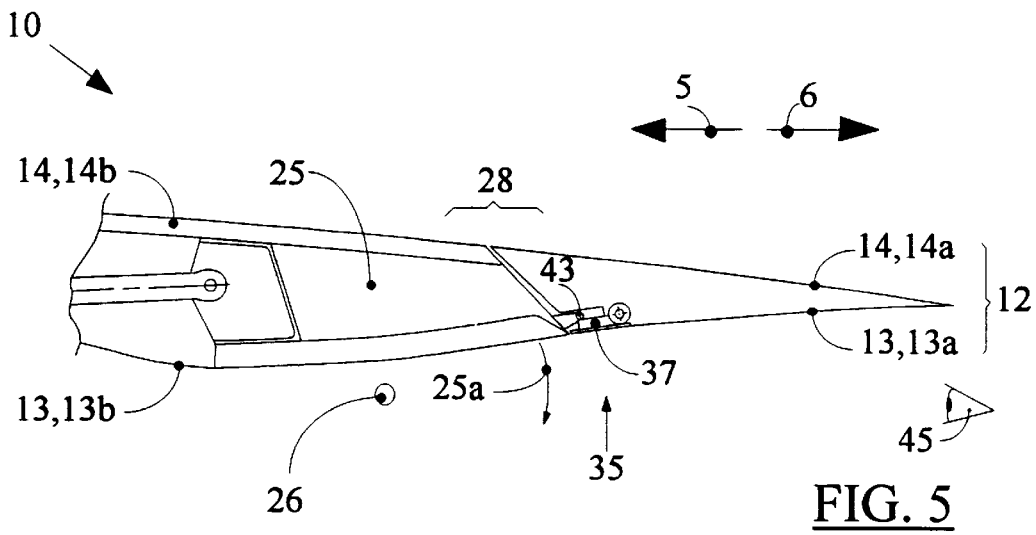
FIG. 5 shows the configuration of a locking system aft of a shutter.

In the embodiment of FIG. 5, a locking system 35 is mounted at the aft end 28 of the shutter 25. It is understood that when the latch 37 is in the open mode, it projects from the inner wall 13 and is well visible to an external observer 45 at the rear of the thrust reverser 10.

Figure 6:
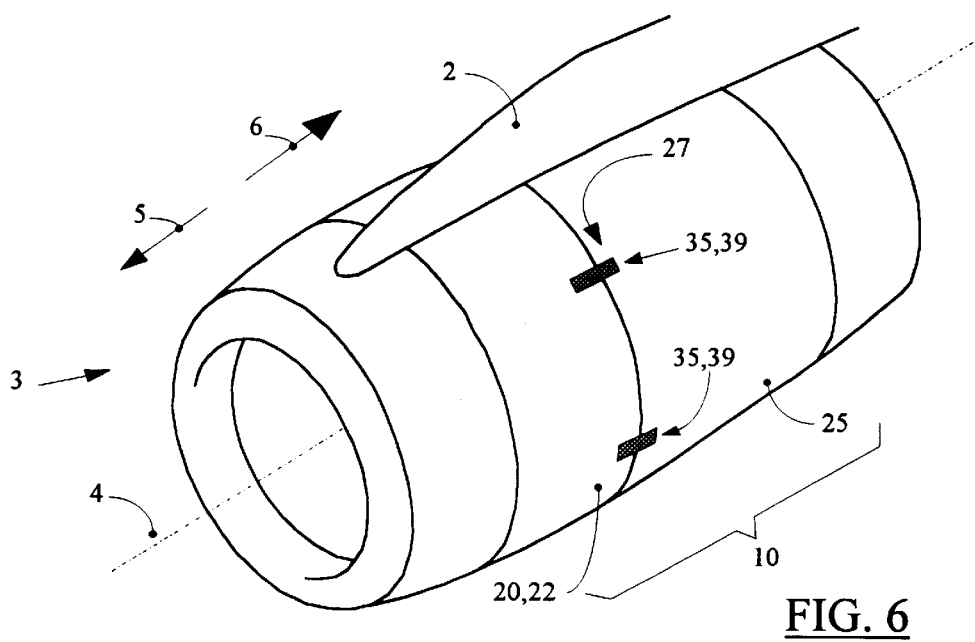
FIG. 6 shows the configuration of the emergency locking systems on "cascade" type thrust reverser.

In FIG. 6 the thrust reverser 10 is of the "cascade" type and comprises an annular shutter 25 here shown in the closed position and thereby coveting the radial apertures 21 of FIGS. 3 and 4. Contrary to the case of the pivoting shutters 25 illustrated above, the shutter 25 of this embodiment opens by means of a rearward translation 6 and recloses by a forward translation 5 until its front part 27 abuts the fore frame 22 where locking is assured by a plurality of locking systems 35 distributed over the periphery of the fore frame 22.

In this embodiment and because the shutter 25 moves substantially parallel to the outer wall 14, the end 41 of the latch 37 cooperating with the lock-interfacing means 43 forms an elbow passing behind (6) the lock-interfacing means 43 to keep it in place.

A preferred embodiment of the invention has been described above. However, it is to be understood that various modifications to the preferred embodiment could be made by any person skilled in the art without departing from the scope of the invention as defined in the claims that follow.

We claim:

1. A thrust reverser (10) with a lock-status display, said thrust reverser (10) in particular comprising an annular structure (12) enclosing the gas turbine engine, said annular structure (12) comprising a radially inner wall (13) and a radially outer wall (14), said annular structure furthermore comprising a first fixed portion (20) with radial apertures (21) and also comprising at least one second displaceable shutter portion (25), covering said radial apertures (21), said at least one shutter (25) each locked closed relative to the fixed portion (20) by at least one locking system (35);

said locking system (35) comprises a lock (36) rigidly affixed to one part (20, 25) of the annular structure (12) fitted with a pivotable and driveable latch (37) hinging on a body (38) of the lock (36);

said latch of said at least one locking system (35) being mounted on one of said radially inner and outer walls (13, 14);

said latch (37) pivoting on a hinge means and including an end (41) cooperating with a lock-interfacing means (43) rigidly joined to the other part (25, 30) of the annular structure to lock said at least one shutter;

said latch end (41) projecting at least partly outwardly from said one wall (13, 14) when said latch is in the open mode whereby the position of the latch in the open mode is readily visible to an observer;

said at least one locking system (35) not projecting from the one wall (13,14) when said latch (37) is in the closed position so that said at least one locking system (35) is masked when in the closed mode.

2. The thrust reverser as claimed in claim 1, wherein the latch (37) comprises a cover (39) which fits inside an aperture (40) of the one wall (13, 14) and wherein said cover (39) is aligned with said wall (13, 14) when the latch (37) is in the closed mode so that aerodynamic continuity of said wall (13, 14) when said latch (37) is in the closed mode is provided.

\* \* \* \* \*

UNITED STATES PATENT AND TRADEMARK OFFICE
CERTIFICATE OF CORRECTION

PATENT NO. : 6,148,607
DATED : November 21, 2000
INVENTOR(S) : Baudu et al.

It is certified that error appears in the above-identified patent and that said Letters Patent is hereby corrected as shown below:

Column 4,
Line 11, "coveting" should read -- covering --.

Signed and Sealed this

Third Day of December, 2002

JAMES E. ROGAN
*Director of the United States Patent and Trademark Office*